United States Patent [19]

Pascher

[11] Patent Number: 5,113,276
[45] Date of Patent: May 12, 1992

[54] OPTICAL COMMUNICATION NETWORK USING REDUNDANT WAVEGUIDES AND TWO WAY OPERATION

[75] Inventor: Helmut Pascher, Munich, Fed. Rep. of Germany

[73] Assignee: Siemens Aktiengesellschaft, Munich, Fed. Rep. of Germany

[21] Appl. No.: 586,868

[22] Filed: Sep. 24, 1990

[30] Foreign Application Priority Data

Nov. 9, 1989 [DE] Fed. Rep. of Germany .... 3937360.6

[51] Int. Cl.$^5$ .............................................. H04J 14/00
[52] U.S. Cl. .................................................. 359/117
[58] Field of Search ......................... 350/96.15, 96.16;
370/1, 3, 4, 16, 112, 16.1; 455/600, 612;
371/8.1, 8.2; 359/117

[56] References Cited

U.S. PATENT DOCUMENTS

| 4,062,043 | 12/1977 | Zeidler | 455/612 |
| 4,726,010 | 2/1988 | Ali et al. | 370/3 |
| 4,787,692 | 11/1988 | Spanke | 350/96.16 |
| 4,910,726 | 3/1990 | Stanley | 455/612 |

FOREIGN PATENT DOCUMENTS

| 3507064 | 8/1986 | Fed. Rep. of Germany | 370/3 |
| 0006926 | 1/1988 | Japan | 455/600 |

*Primary Examiner*—Edward L. Coles, Sr.
*Assistant Examiner*—L. Pascal

[57] ABSTRACT

In an optical communication network for multiplex operation, a light waveguide is conducted up to a branching point proceeding from a respective distributing location. A division of the signals into two sub-signals with a directional coupler occurs at this branching point. A second light waveguide that is connected to the second input of the directional coupler is additionally laid between the distributing and the branching point. A switching onto the second light waveguide is provided. A system is described for two-way management using a pair of direction couplers connected crossed to a plurality of direction couplers on the subscriber side.

12 Claims, 1 Drawing Sheet

OPTICAL COMMUNICATION NETWORK USING REDUNDANT WAVEGUIDES AND TWO WAY OPERATION

BACKGROUND OF THE INVENTION

The invention is directed to an optical communication network for multiplex operation wherein, proceeding from a distribution location, a respective light waveguide is conducted up to a branching point where a division of the signals into two or more sub-signals ensues with a directional coupler.

An optical communication network of this type is disclosed by German published application DE-35 07 064 and corresponding U.S. Pat. No. 4,726,010. The signals coming from a central location are transmitted in time-division multiplexing up to the subscriber region with a first optical wave length, whereas a second wave length is provided for the signals coming from the subscribers. The branching onto a plurality of subscriber locations ensues with passive optical couplers, for example directional couplers. Only one respective light waveguide is available for a transmission path between the distribution location and the branching point. Since a greater plurality of subscribers (for example 16 through 256 given the cascade circuit of directional couplers) is dependent on the integrity of this one light waveguide, the corresponding plurality of subscriber locations is likewise no longer connected to the distribution location given outage of this one light waveguide. A further difficulty is comprised therein that the one light waveguide is at least temporarily not available for the communication transmission given work at the link (for example splicing jobs or the like) and the subscriber connections are therefore interrupted.

SUMMARY OF THE INVENTION

The object of the present invention is to make an additional transmission link to the subscribers available in a simple way and, without greater outlay, to simultaneously guarantee a malfunction-free servicing of the subscribers. In an optical communication network of the species initially cited, this object is inventively achieved in that a second light waveguide is additionally laid between the distributing location and the branching point and in that this second light waveguide is connected to the second input of the directional coupler.

Since the second input of the directional coupler (normally provided with a reflection-free termination) can be used for the second light waveguide, no significant outlay in the branching region is required for this purpose. The offering of an additional light waveguide for such a transmission path can likewise no longer be viewed as a significant, additional outlay given the great number of [optical] fibers within light waveguide cables that is currently possible. In case of malfunction or given splicing jobs, a second transmission path is therefore present onto which the transmission means in the region of the distributing location can be switched without further ado.

A doubled connection between the subscribers and the distributing location (2-way operation) is also possible within the framework of the invention (for example, via a wave length-division multiplexing).

An optical communications network for multiplex operation therefore is provided whereby, proceeding from a distribution location (VT), a respective light waveguide (LW1) is conducted up to a branching point (VZ) where a division of the signals into two or more sub-signals then ensues with a directional coupler (RK1), characterized in that a second light waveguide (LW2) is additionally laid between the distributing location (VT) and the branching point (VZ); and in that this second light waveguide (LW2) is connected to the second input (E2) of the directional coupler (RK1). Additionally, it can be provided that the second light waveguide (LW2) is terminated reflection-free (ASS) at its end at the distributing location (VT). Additionally, it can be provided that a switch-over means (SW) is present in the region of the distributing location (VT), said switch-over means switching the output and/or input of the distributing location onto the second light waveguide (LW2) as needed. Also, it can be provided that a plurality of directional couplers (RK1, RK11, RK12) are connected in cascade. Another configuration of the invention has two directional couplers (RKV1, RKV2) provided at the side of the distributing location for a two-way operation in which the two directional couplers are each connected to respectively one of the light waveguides (LW1, LW2), and have outputs which are connected crossed onto four following directional couplers.

The invention and the developments thereof shall be set forth in greater detail below with reference to drawings.

DETAILED DESCRIPTION OF THE PREFERRED EMBODIMENTS

Figure 1:
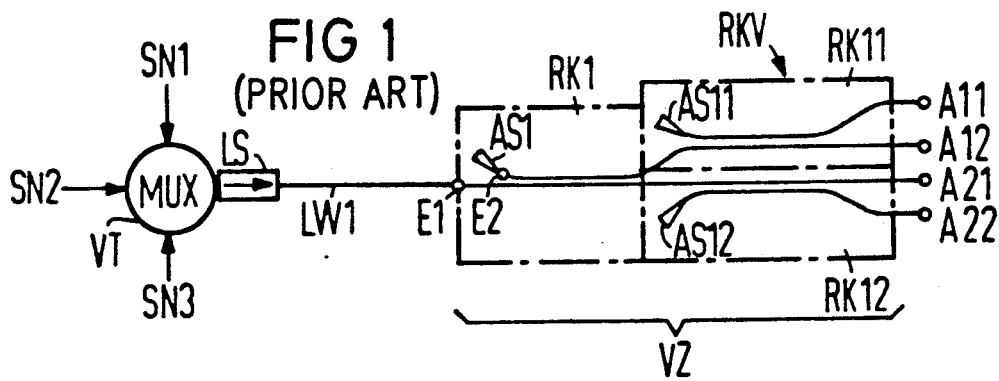
FIG. 1 is a schematic diagram of a communication network having a branching point conforming to the prior art.

A distributing location is referenced VT in FIG. 1. Various signals SN1-SN3 (for example, television signals, telephone signals, teleprinting signals, etc.) are conducted to this distributing location, these signals being converted into a multiplex signal with a multiplexing means. This multiplex signal, preferably a TDMA signal, is supplied into an optical network with a transmitter such as a laser transmitter LS, only one transmission path of this optical network being shown in the present example of FIG. 1. In reality, a plurality of transmission paths and/or a plurality of laser transmitters can be provided. A light waveguide LW1 is provided for the transmission to a defined group of subscribers, the remote end of this light waveguide LW1 being connected to a branching means or branching circuit VZ (standard distances from VT between 100 and 3000 meters, on average about 1500 meters). It is assumed in the present example that a branching onto four outputs A11-A22 is to be carried out. To this end, the light waveguide LW1 is connected to the input E1 of a directional coupler RK1 that is preferably fashioned as a 3 dB coupler. The communication signal coming from the light waveguide LW1 is thus divided into two sub-signals of identical size at the outputs of the directional coupler RK1, these sub-signals being in turn supplied to two further directional couplers RK11 and RK12. The four outputs A11-A22 of these directional couplers RK11 and RK12 supply the four output signals of the branching circuit VZ that, preferably, are of identical size. The respectively open outputs of the directional couplers RK1, RK11 and RK12 are provided with reflection-free terminations AS1, AS11 and AS12. The direction couplers RK1, RK11 and RK12 thus form a one to four (1:4) coupler RKV.

Figure 2:
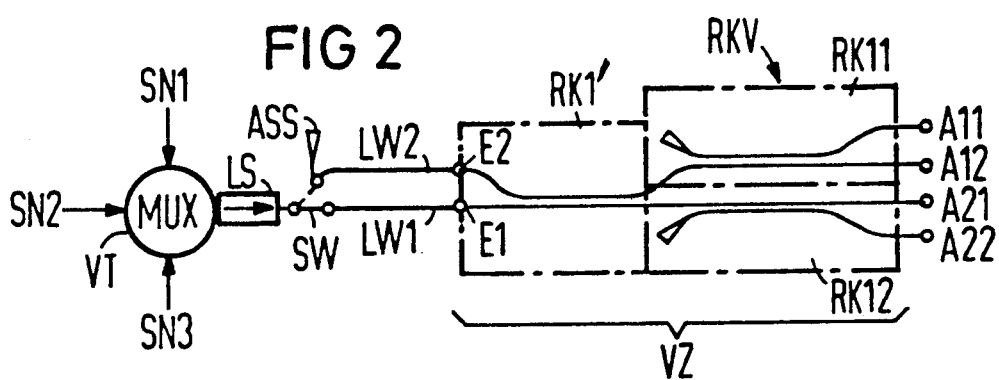
FIG. 2 is a schematic diagram of a communication network of the invention.

Given an outage of the light waveguide LW1 (due, for example, to damage or during splicing jobs or the like), all of the outputs A11-A22 in the region of the branching point VZ are no longer connected to the central distributing location VT. An alleviation of this situation with little outlay is possible when the configuration shown in FIG. 2 is used. In addition to the elements described and shown in FIG. 1, a further light waveguide LW2 is provided here, this being capable of being laid in the same cable with the light waveguide LW1 or being capable of being conducted via a completely separate lane and being connected to the second input E2 of the directional coupler RK1' in the region of the branching point VZ (i.e., E2 used instead of the reflection-free termination AS1). The other end of this light waveguide LW2 is open or, respectively, can be terminated by a reflection-free termination ASS as warranted. When the length of the light waveguide LW2 is adequately long, the termination ASS can be foregone because the line attenuation on the light waveguide LW2 is then so high that even totally reflected residual components of these signals from the light waveguide LW1 can no longer lead to disturbances when they re-appear at the terminal E2. The structure of the other directional couplers RK11 and RK12 corresponds to that of FIG. 1.

The transmitter for the multiplex signals LS is connected to the light waveguide LW1 via a switch SW and the signal energy is thus equally divided onto the terminals A11-A22. Given a malfunction or interruption of the light waveguide LW1, the switch SW switches the output of the transmitter LS over to the light waveguide LW2, so that the signal energy is again available in equal parts at the outputs A11-A22. A malfunction or deterioration of a light waveguide thus no longer has any disturbing influence on the basis of the simple switch-over possibility, whereby the additional outlay at the directional coupler RK1 is hardly of significance because the light waveguide LW2 merely has to be connected to the terminal E2 instead of the terminating impedance AS1.

Figure 3:
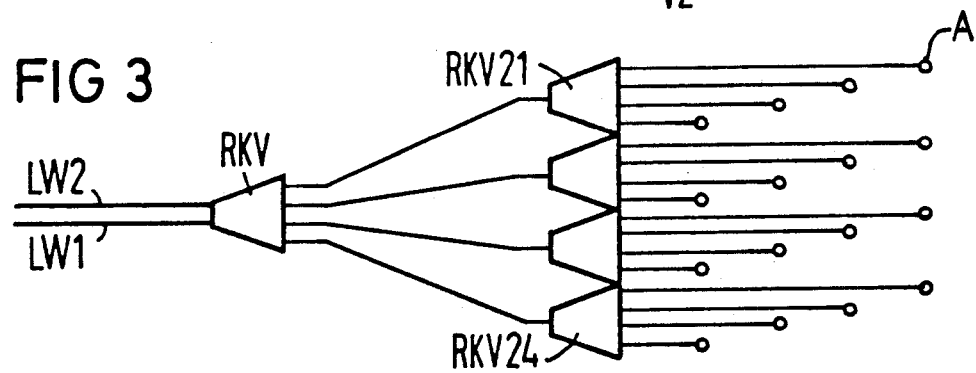
FIG. 3 is a schematic illustration of the communication network of FIG. 2 with a greater plurality of subscriber lines.

FIG. 3 shows an arrangement corresponding to FIG. 2, whereby respectively four further 1:4 couplers RKV21-RKV24 are connected to the four outputs of the 1:4 coupler RKV (whose structure is shown in detail in FIG. 2), so that a total of 16 outputs A are available. A plurality of connections (plurality of subscribers) up to, for example, 256 can thus be realized without further ado via the initially cited TDMA multiplex system in a grouping of sixteens that is beneficial for the physical network design.

Figure 4:
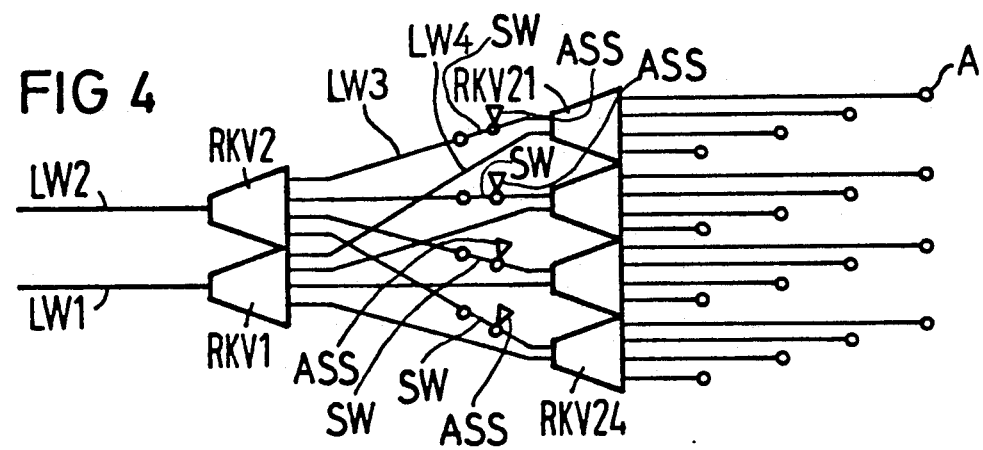
FIG. 4 is a schematic diagram of a communication network of the invention with two-way management.

Up to now, only the transmission of messages in the direction from the central distributing location VT in the direction toward the branching point VZ (i.e., in the direction to the subscribers) has been set forth. As proceeds from FIG. 4, the same structure can also be utilized when a two-way management is intended. In this case, a two's pair of 1:4 directional couplers RKV1 and RKV2 is to be provided, one for each of the light waveguides LW1 and LW2, the terminals thereof at the subscriber side to be connected crossed to the inputs of four further 1:4 directional couplers RKV21 through RKV24. Expressed in other terms, this means that the inputs of the directional couplers RKV21 through RKV24 are also to be doubly connected, such as by branch light waveguides LW3, LW4, i.e. in a way similar to that shown in the case of the directional coupler RK1' in FIG. 2, conducted to similar terminals such as E1 and E2 of RK1' and utilizing reflection-free terminals ASS as well as switch-over means such as a plurality of switches SW.

Although various minor changes and modifications might be proposed by those skilled in the art, it will be understood that I wish to include within the claims of the patent warranted hereon all such changes and modifications as reasonably come within my contribution to the art.

I claim as my invention:

1. An optical communication network for multiplex operation comprising:
    a distributing means for sending a multiplex signal;
    a first light waveguide for receiving said multiplex signal from said distributing means at a first end of said first light waveguide;
    a branching means, providing a direction coupler having a first input terminal, a second input terminal, and an output, said first light waveguide being optically connected to said first input terminal at a second end of said first light waveguide, said direction coupler arranged and adapted to divide a multiplex signal received by either of said first or second input terminals into at least two sub-signals at said output of said direction coupler;
    a second light waveguide optically connected between a first end of said distributing means and a second end at said branching means, said second end of said second light waveguide being optically connected to said second input terminal of said direction coupler means; and
    a switch-over means for switching the multiplex signal from said distributing means from said first light waveguide to said second light waveguide.

2. An optical communication network according to claim 1, wherein said second light waveguide is terminated reflection-free at an end of said second light waveguide at said distributing means.

3. An optical communication network according to claim 1, wherein said branching means comprises a plurality of directional couplers connected in cascade.

4. An optical communications network according to claim 1, wherein said branching means further comprises a second and third directional coupler, each receiving one sub-signal and dividing said sub-signal into two sub-sub-signals, for a total of at least four sub-sub-signals.

5. An optical communications network according to claim 4, wherein said optical communications network further comprises at least four additional branching means, each receiving one of said sub-sub-signal and dividing said one sub-sub-signal into four sub-sub-sub-signals, for a total of at least 16 sub-sub-sub-signals.

6. An optical communications network for multiplex operation comprising:
    a first light waveguide for communicating a signal;
    a second light waveguide for communicating a signal;

a first, second, third, fourth, fifth and sixth branching means, each of said branching means comprising a first, second, and third directional coupler, said first direction coupler arranged and adapted for an input signal conducted to an input of said first directional coupler to be split into at least two sub-signals, each of said two sub-signals conducted to one of said second directional coupler and said third directional coupler wherein each of said second and said third direction couplers are arranged and adapted for each of said sub-signals to be further split into two sub-sub-signals; and said first light wave guide is optically connected to said first branching means, said second branching means receiving said second light waveguide is optically connected to said second branching means, said first and second branching means splitting signals from said first and second light waveguides into four sub-sub-signals respectively, said first branching means having a first path means for communicating its four sub-sub-signals to a first input of each of said third, fourth, fifth and sixth branching means respectively, said branching means having a second path means for communicating each of its sub-sub-signals to a second input of each of said third, fourth, fifth and sixth branching means respectively, said third, fourth, fifth and sixth branching means therefore each receiving two sub-sub-signals, either of said sub-sub-signals are thereafter split into four resultant signals, making a total of 16 resultant signals.

7. An optical communications network according to claim 6 further comprising at least one switch-over means applied to said second path means, said switch-over means for selectively communicating at least one of said sub-sub-signals through said second path means to at least one of said third, fourth, fifth and sixth branching means.

8. An optical communications network according to claim 7, wherein said at least one switch over means comprises four switch over means applied in said second path means for selectively applying one of said sub-sub-signal to each of said third, fourth, fifth and sixth branching means.

9. An optical communications network according to claim 7, wherein said first path means and said second path means comprise
- at least one first branch waveguide and at least one second branch waveguide respectively; and
- at least one of said third, fourth, fifth and sixth branching means comprises a first input terminal and a second input terminal, said at least one of said third, fourth, fifth and sixth branching means receiving one said first branch waveguide at said first input terminal and one said second branch waveguide at said second input terminal.

10. An optical communications network according to claim 9, wherein each of said third, fourth, fifth and sixth branching means comprise a first input terminal and a second input terminal and each receive a first branch waveguide from said first path means at said first input terminal and a branch waveguide from said second path means at said second input terminal.

11. An optical communications network according to claim 10, wherein said second path means is terminated reflection-free at said switch over means.

12. An optical communications network according to claim 9, wherein said one second branch waveguide is terminated reflection-free at said switch over means.

* * * * *